United States Patent [19]

Papsdorf

[11] Patent Number: 4,998,336

[45] Date of Patent: Mar. 12, 1991

[54] TRUSS FABRICATION APPARATUS AND METHOD OF MAKING A TRUSS

[76] Inventor: John Papsdorf, 222 Letts Rd., Lake Orion, Mich. 48035

[21] Appl. No.: 309,094

[22] Filed: Feb. 10, 1989

[51] Int. Cl.[5] ........................ B23P 19/04; B65H 13/00

[52] U.S. Cl. ........................................ 29/432; 29/429; 269/910; 414/222

[58] Field of Search ................. 29/429, 430, 432, 701, 29/772, 795, 783, 791, 822; 269/910; 72/417, 446, 448; 52/90, 93, 372, 693; 100/41, 100, 218, 231, 913; 227/105, 152; 414/222, 529, 590, 678, 680

[56] References Cited

U.S. PATENT DOCUMENTS

| | | | |
|---|---|---|---|
| 2,183,983 | 12/1939 | Bostwick | 100/218 X |
| 2,527,698 | 10/1950 | Borzym | 72/417 |
| 3,390,627 | 7/1968 | Levkovitz | 100/41 |
| 3,487,430 | 12/1969 | Schmitt | 100/231 |
| 3,495,526 | 2/1970 | Mohler et al. | 72/446 |
| 3,599,562 | 8/1971 | Hutchens, Sr. | 100/100 |
| 3,650,411 | 3/1972 | Reis et al. | 72/448 X |
| 3,713,381 | 1/1973 | Mort et al. | 227/152 X |
| 3,908,885 | 9/1975 | Scott | 29/432 X |
| 4,024,809 | 5/1977 | Moehlenpah | 100/100 |
| 4,262,588 | 4/1981 | McDonald | 227/152 X |
| 4,384,515 | 5/1983 | Matlock | 100/100 |
| 4,492,016 | 1/1985 | Smets et al. | 227/105 X |
| 4,580,436 | 4/1986 | Nelson | 72/446 |

OTHER PUBLICATIONS

Gang-Nail Systems, "Mobile Home Press System", 1973 Brochure Clary Corporation, Productivity, 1988 Brochure.

Alpine Engineered Products, Inc., "Good Connections", 1988 Brochure.

*Primary Examiner*—Mark Rosenbaum

*Assistant Examiner*—Peter Dungba Vo

*Attorney, Agent, or Firm*—Daniel H. Bliss

[57] ABSTRACT

The present invention is a method and apparatus for fabricating a truss including a plurality of truss components and nailers having projections for engaging the truss components at the ends thereof to form a joint. The present invention includes moving a table from a horizontal position to an inclined position and loading a plurality of nailers and truss components in a predetermined configuration upon a support fixture supported by the table. The present invention includes moving the table to the horizontal position and slidably moving the support fixture from the table to a space between an upper press platen and a lower press platen of a press. The present invention further includes moving the upper press platen towards the lower press platen to advance the projections of the nailers simultaneously into the truss components to form an integral one-piece truss.

4 Claims, 3 Drawing Sheets

TRUSS FABRICATION APPARATUS AND METHOD OF MAKING A TRUSS

BACKGROUND OF THE INVENTION

1. Field of the Invention

The present invention relates generally to the fabrication of trusses, and more particularly to, a method and apparatus for forming a one piece truss.

2. Description of Related Art

Presently, trusses for a roof of a mobile home or garage are constructed of wood. Generally, the fabrication of the truss involves laying out a plurality of wood members or truss components on a support surface and then connecting them together with a "nailer". The nailer is typically a flat plate with a plurality of projections resembling nail extending outwardly perpendicular to the plate.

One method for fabricating the truss has been to lay the truss components in predetermined positions upon a flat or planar support surface. Since these trusses are rather large in size, a person was required to bend over to lay the components on the support surface. The person would then bend over and, using a conventional hammer, hammer the nailer into the truss components at the adjacent ends or "joint"thereof. Alternatively, once the truss components were laid out, a roller connected to a rolling device would press the nailers into the truss components to connect them together. However, the person would generally still be required to bend over to remove the truss after fabrication.

One problem with the above methods is that the operator is required to bend his or her back when laying out the truss components and removing the truss. This has resulted in a large number of back injuries. Another problem with the above methods is that a large amount of time is required for connecting the nailers to the truss components by manual hammering or for the roller to move across the span of the truss to be fabricated. A further problem is that the nailers are not hammered or pressed evenly into the truss components.

An example of an apparatus for fabricating a truss is disclosed in U.S. Pat. No. 3,908,885, issued Sept. 30, 1975, to inventor Robert I. Scott. This patent discloses a press for sandwiching a pair of nailers on opposite sides of the truss components at the joint thereof between a moveable and stationary platen of a press. However, the same problem still results; that is, a person is still required to bend over to lay out the truss components and to remove the fabricated truss. Also, one press is used at each joint of the truss components to allow the nailers to be assembled to the truss components. As a result, a large number of presses are required which is very costly. Also, a large amount of time is required to use a press at each joint to fabricate the truss.

SUMMARY OF THE INVENTION

Accordingly, the present invention is an apparatus for fabricating a truss having a plurality of truss components. The ends of the truss components are joined together by a nailer having outwardly extending projections. The apparatus includes support means for receiving and locating the nailers and truss components in a predetermined configuration. A press means receives the support means for urging the nailers toward the truss components such that the projection for the nailers are advanced into the truss components at opposite sides thereof for interconnecting the truss components at the joints to form an integral one-piece truss. A table means is located adjacent the press means for supporting the support means. A means moves the support means between the table means and the press means. The table means has a first position being generally horizontal and a second position being inclined relative to the first position for loading the truss components and nailers on the support means and for unloading the fabricated truss from the support means.

Additionally, the present invention is also a method for fabricating the truss including the steps of moving a table from a horizontal position to an inclined position and loading a plurality of nailers and truss components in a predetermined configuration upon a support fixture supported by the table. The steps also include moving the table to the horizontal position and moving the support fixture from the table to a space between an upper press platen and a lower press platen of a press. The steps further include moving the upper press platen toward the lower press platen to advance the projections of the nailers simultaneously into the truss components to form an integral one-piece truss.

One advantage of the present invention is the person or operator does not have to significantly bend their back to load the truss components and nailers in predetermined positions upon the support surface. Another advantage of the present invention is that less time is required to fabricate the truss because the nailers are advanced into the truss components simultaneously. A further advantage of the present invention is that the nailers are advanced or pressed evenly to the truss components. Additionally, the present invention is less expensive to manufacture and requires less time to fabricate the truss.

Other advantages of the present invention will be readily appreciated by those skilled in the art when viewed in light of the following detailed description and accompanying drawings.

DESCRIPTION OF THE PREFERRED EMBODIMENT

Figure 1:
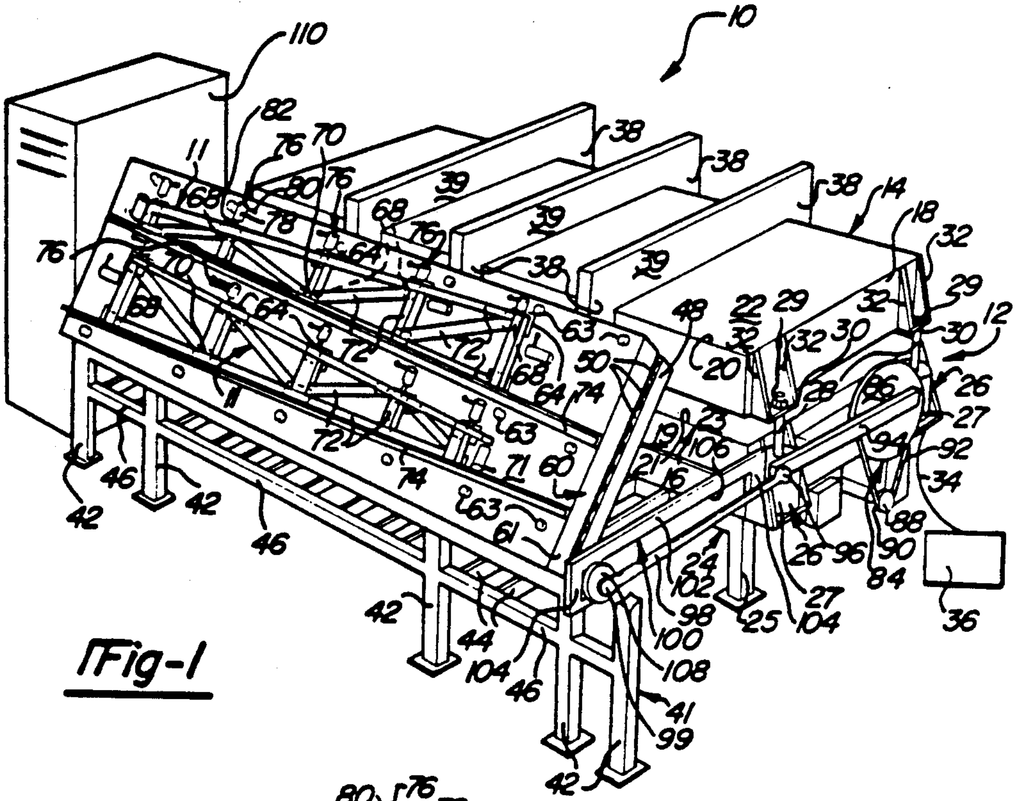
FIG. 1 is an overall perspective view of an apparatus for fabricating a truss constructed in accordance with the principles of the present invention.

Referring to FIG. 1, an apparatus 10 for fabricating a truss, generally indicated at 11, such as a wooden truss for a roof of a mobile home or garage is generally shown. The apparatus 10 includes a press, generally shown at 12, for fabricating the truss 11.

Referring to FIGS. 1 through 5, the press 12 includes an upper press platen, generally indicted at 14, and a lower press platen, generally indicated at 16. The press platens 14 and 16 are generally rectangular in shape and include an outer frame 18 and 19, respectively, made of metal plates welded together at adjoining ends to form the rectangular outer frame 18 and 19. Reinforcing members (not shown) such as metal rods or the like extend inwardly into a corresponding cavity 20 and 21 formed by the outer frames 18 and 19, respectively. The cavities 20 and 21 are filled with cement or the like to form a bed 22 and 23 enclosed by the outer frames 18 and 19, respectively, and forming the platens 14 and 16.

The lower press platen 16 is supported by a stand, generally indicated at 24, comprising a plurality of legs 25 to support the lower platen 16 in a substantially spaced horizontal relationship relative to a support surface such as a floor or the like. The upper press platen 14 is supported in a substantially spaced horizontal relationship to the lower press platen 16 by a plurality of fluid actuating devices, generally indicated at 26.

The fluid actuating device 26 includes a fluid cylinder 27 supported by and secured to the outer frame 19 of the lower press platen 16 by welding or the like. The fluid actuating device 26 also includes a piston rod 28 extending outwardly from one end of the fluid cylinder 27. One end of piston rod 28 is connected to a moveable piston (not shown) disposed within the fluid cylinder 27. The other end of the piston rod 28 is connected by means such as fasteners 29 or the like to a flange member 30 extending horizontally outwardly from the outer frame 18. The flange member 30 is secured to and supported by generally triangular shaped plate members 32 secured to the outer frame 18 by welding or the like.

The fluid actuating devices 26 are positioned along at least two, preferably all four sides of the press 12. The fluid actuating devices 26 are connected in a conventional manner by conduits or fluid lines 34 to a fluid pressure source 36 such as a hydraulic pump and fluid reservoir or the like. It should be appreciated that the fluid actuating devices 26 are pressurized to extend the piston rods 28 to support the upper press platen 14 in spaced relationship to the lower press platen 16. It should also be appreciated that the piston rod 28 may have a U-shaped clamp 37 at the free end thereof and connected by fastening means 29 to a rod 37*a* extending perpendicularly through a vertical flange member 38 which extends upwardly along the outer frame 18 and is connected to a horizontal flange member 39 extending across the width of the bed 22. It should further be appreciated that on one side of the press 12, a tiltable or rotatable fluid actuating device 26 may have a C-shaped member 40 (FIG. 5) at the free end of the piston rod 28 for engaging and disengaging a rod 37*a* the flange member 38.

The apparatus 10 also includes an exterior stand, generally indicated at 41, along one side of the press 12. The stand 41 comprises a plurality of legs 42 and interconnecting lateral and longitudinal support members 44 and 46 to form a support framework. The stand 41 also includes a support or moveable table 48. The table 48 is generally rectangular in shape and is pivotally supported in a conventional manner at one end to the stand 41. The table 48 includes a plurality of rollers 50 rotatably secured to the table 48 to reduce the sliding friction of a drawer 60 to be described. A plurality of fluid actuating devices 52 are connected to the table 48 along the length thereof to move or rotate the table 48 between a generally horizontal position as shown in solid lines in FIG. 3 and an inclined position as shown in solid lines in FIG. 2.

The fluid actuating device 52 includes a fluid cylinder 54 secured to the stand 40 by welding or the like. A piston rod 56 extends outwardly from one end of the fluid cylinder 54. One end of the piston rod 56 is connected to a moveable piston (not shown) disposed within the fluid cylinder 54. The other end of the piston rod 56 is pivotally connected in a conventional manner at 58 to the table 48. The fluid actuating device 52 is connected by fluid lines 34 to the fluid pressure source 36. It should be appreciated that the piston rod 56 is extended to move the table 48 to its inclinded position and retracted to move the table 48 to its horizontal position.

The apparatus 10 further includes a support fixture or drawer, generally indicated at 60, which is supported by the table 48. The drawer 60 has a generally rectangular outer frame 61 connected to a generally planar or horizontal bottom 61*a* (FIG. 6) which rests on the rollers 50. The drawer 60 includes a substantially planar plate member 62 made of wood or the like. The plate member 62 includes a plurality of longitudinally and laterally spaced spring loaded pins or members 63 to be downwardly yieldable as will be described. The spring loaded pins 63 support the plate member 62 in spaced relationship relative to the bottom 61*a*of the drawer 60. The plate member 62 also includes a plurality of apertures 64 formed in a predetermined pattern in the plate member 62 where the ends of truss components 72 meet to form a joint. The apertures 64 are generally rectangular in shape and may be lined with thin metal strips 65 (FIG. 6).

Figure 6:
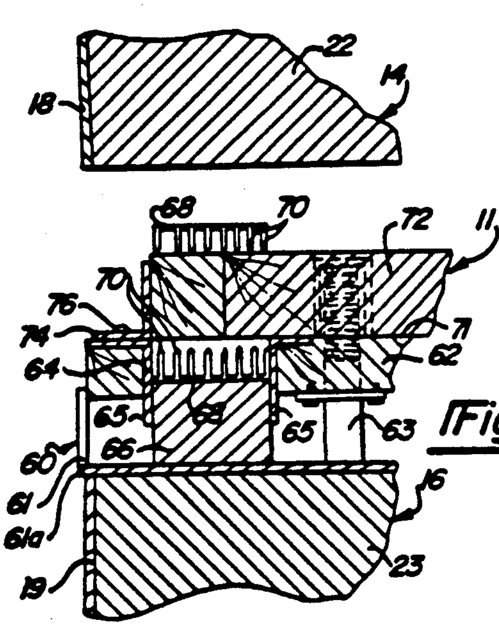
FIG. 6 is a sectional view taken along line 6—6 of FIG. 5 thereof prior to assembly.
Figure 6A:
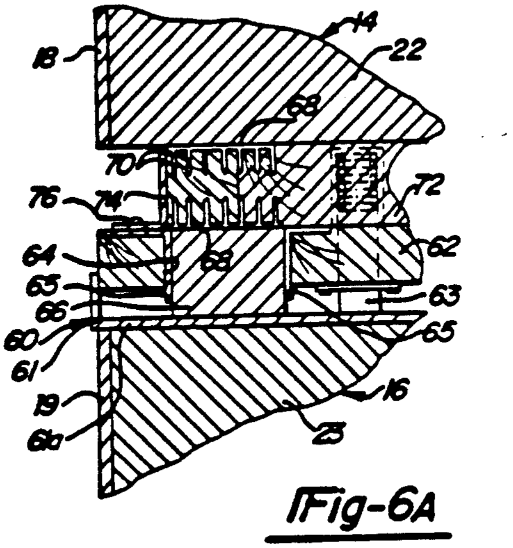
FIG. 6A is a view similar to FIG. 6 after assembly.

Referring to FIG. 6, the drawer 60 is disposed in the press 12 between the upper press platen 14 and the lower press platen 16. The spring loaded pins 63 support the plate member 62 in spaced relationship to the bottom 61*a* which rests on the lower press platen 16. A generally rectangular block 66 is disposed partially in a corresponding aperture 64 and rests upon the surface of the bottom 61*a*. The blocks 66 are preferably made of steel. A nailer 68 comprises a generally flat or planar plate with a plurality of projections or nails 70 extending outwardly perpendicular to the plate. The nailer 68 is disposed in the aperture 64 such that the plate rests upon the block 66 and the nails 70 extend upwardly in the aperture 64 toward the upper press platen 14. It should be appreciated that the nails 70 do not extend above the upper surface 71 of the plate member 62 to allow the nailer 68 to engage the truss components 72 only upon downward deflection of the plate member 62 toward the lower press platen 16 as illustrated in FIG. 6A.

Referring to FIGS. 1 and 6, the truss 11 includes a plurality of truss components 72 are disposed on the upper surface 71 of the plate member 62 in a predetermined pattern such that the ends thereof are disposed over a corresponding aperture 64. Another nailer 68 is disposed over the ends of the truss components 72 at the location of the apertures 64 such that the projections 70 rest upon the truss components 72 and extend toward the lower press platen 16. A staple (not shown) is used to temporarily secure the nailer 68 to the truss components 72 prior to fabrication or assembly. It should be appreciated that any means could be used to secure the nailer 68 temporarily to the truss components 72 when the table 48 is in the inclined position.

Referring again to FIGS. 1 and 6, the drawer 60 includes a pair of longitudinally extending and laterally spaced rails 74. The rails 68 are generally "L" shaped in cross-section and are secured by means such as fasteners 76 to the plate member 62. Each rail 74 allows a corresponding truss 11 to be fabricated by supporting the longitudinally extending truss components 72 upon the table 48 when the table 48 is in the inclined position. The drawer 60 also includes a plurality of truss component supporting devices 76 disposed about the apertures 64 to secure the truss components 72 in place and prevent longitudinal or lateral movement. The supporting devices 76 comprises a cylinder 78 secured to the plate member 62 and having a pivotal finger 80 at one end which moves a rod 82 extending axially outwardly from the other end of the cylinder 78. The rod 82 engages and disengages the truss components 72 due to the pivotal movement of the finger 80 to support the truss components 72.

Referring to FIGS. 1 through 5, the apparatus 10 includes an actuating or moving device, generally indicated at 84, for moving the drawer 60 into and out of the space formed between the upper press platen 14 and lower press platen 16 of the press 12. The moving device 84 includes a gear or wheel 86 pivotally or rotatably secured to the outer frame 19 of the lower platen 16. A smaller drive gear or wheel 88 is connected by a shaft 90 to a motor (not shown). The drive gear 88 is spaced below the wheel 86 and is interconnected by a belt 92 or the like such that rotation of the drive gear 88 by the shaft 90 and motor causes the belt 92 and wheel 86 to rotate. The moving device 84 also includes an arm 94 fixedly connected to the center of the wheel 86. The arm 94 and wheel 86 rotate together as one unit to form an eccentric. The other end of the arm 94 is pivotally connected in a conventional manner at 96 to one end of a connecting rod 98. The other end of the connecting rod 98 is pivotally secured at 99 to one end of the outer frame 61 of the drawer 60. It should be appreciated that as the arm 94 rotates, it moves the connecting rod 98 and drawer 60 between the stand 40 and press 12.

The moving device 84 also includes a track, generally indicated at 100, for guiding the drawer 60 substantially horizontally between the table 48 and press 12. The track 100 includes a pair of vertical spaced side members 102 connected by means such as welding to a pair of transversely spaced end members 104 to form a generally rectangular opening 106. A roller or bearing 108 is disposed within the opening 106 and interconnected between the end of the connecting rod 98 and drawer 60. This roller 108 translates along the track 100 and is limited in transverse movement by the end members 104 and by vertical movement by the side members 102.

The apparatus 10 includes a control panel 110 electrically connected to the motor and pressure source 36 to control the movement or operation of the apparatus 10 in a manner to be described. The control panel 110 may comprise a preprogrammed disk, electronic control unit or the like.

Figure 2:
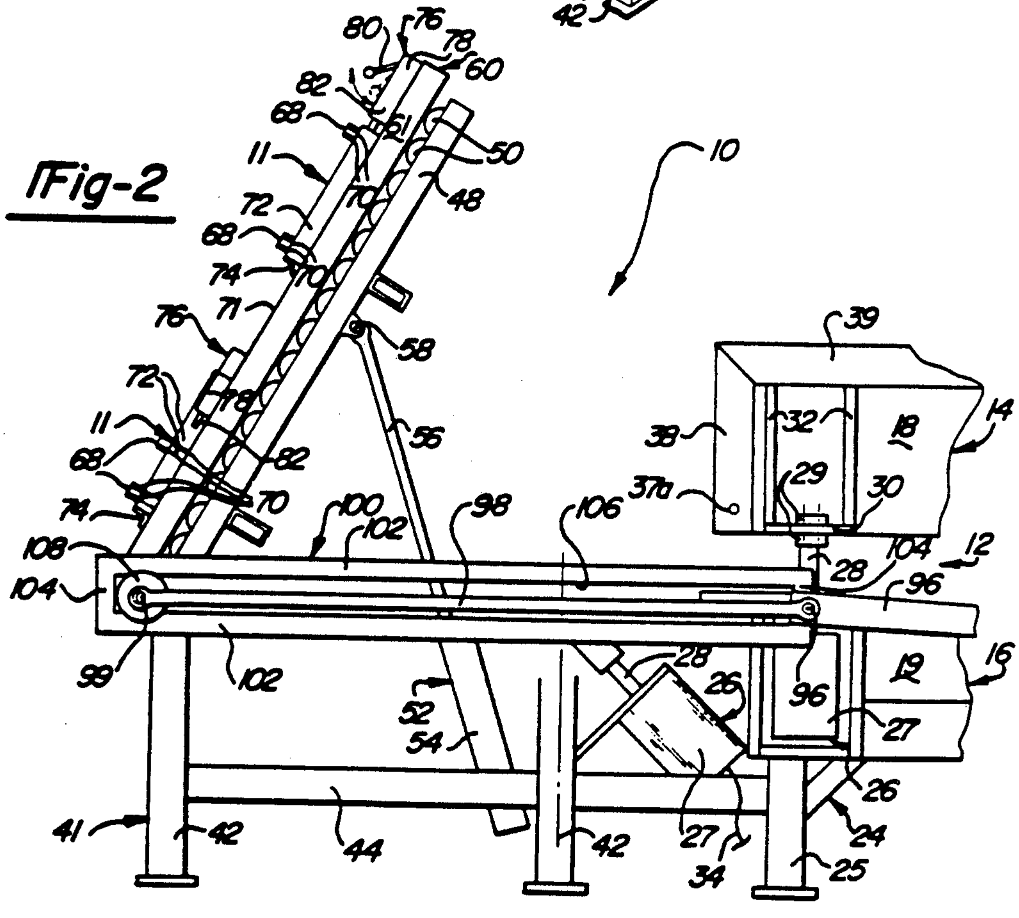
FIG. 2 is a partial elevational view of the apparatus of FIG. 1 with a moveable table in an inclined position.
Figure 3:
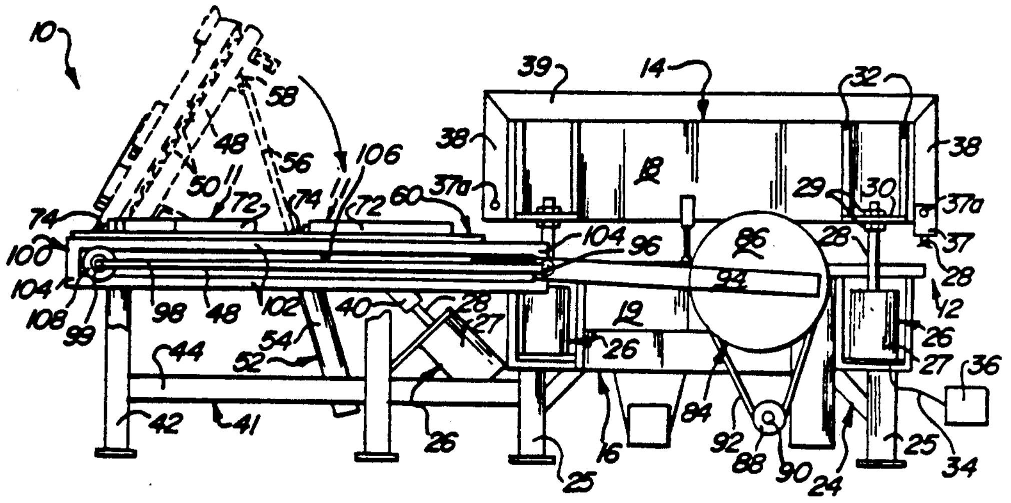
FIG. 3 is an elevational view of the apparatus of FIG. 2 fully shown and the moveable table in a horizontal position.
Figure 4:
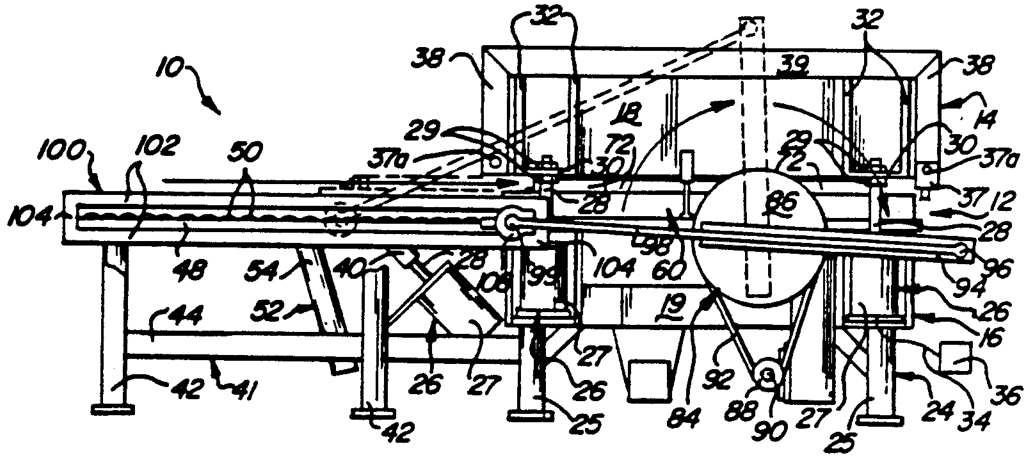
FIG. 4 is a view similar to FIG. 3 with a support fixture or drawer disposed between platens of a press prior to assembly.

Accordingly, the present invention provides a method of making or fabricating the truss 11. It should, however, be readily apparent to one skilled in the art that by the following description of the operation of the apparatus 10, the method of fabricating the truss is also described. As illustrated in FIGS. 1 and 2, the table 48 is in the inclinded position. The operator places a nailer 68 with the nails 70 facing upward on the blocks 66 in the apertures 64 as illustrated in FIG. 6. The operator then places the longitudinal truss components 72 along the rails 74. The operator then places the other truss components 72 on the plate member 62 of the drawer 60 such that the ends of the truss components 72 are disposed across the apertures 64 in a predetermined configuration or pattern. The operator then pivots the finger 80 of the support devices 76 such that the rod 82 engages the truss components 72 to prevent their movement. A second nailer 68 is then placed upon the upper surface of the truss components 72 at the apertures 64 and a staple or the like is used to retain the nailers 68 temporarily in position.

When all the truss components 72 are properly placed upon the drawer 60 and the nailers 68 in place, the operator activates a switch (not shown) which is connected to the control panel 110. The control panel 110 then activates the fluid pressure source 36 such that the fluid cylinders 54 retract the piston rod 56 and the table 48 is pivoted from the inclined position shown in phantom lines in FIG. 3 to the horizontal position shown in solid lines in FIG. 3. The control panel 110 then activates the motor which turns the shaft 90, drive gear 88, belt 92 and wheel 86. As the wheel rotates, the arm 94 rotates and moves one end of the connecting rod 98 toward the press 12 as shown in phantom lines in FIG. 4. The other end of the connecting rod 98 is connected to the roller 108 and drawer 60 which moves the drawer 60 to the space between the upper and lower press platens 14 and 16, respectively, as shown in solid lines in FIG. 4.

Figure 5:
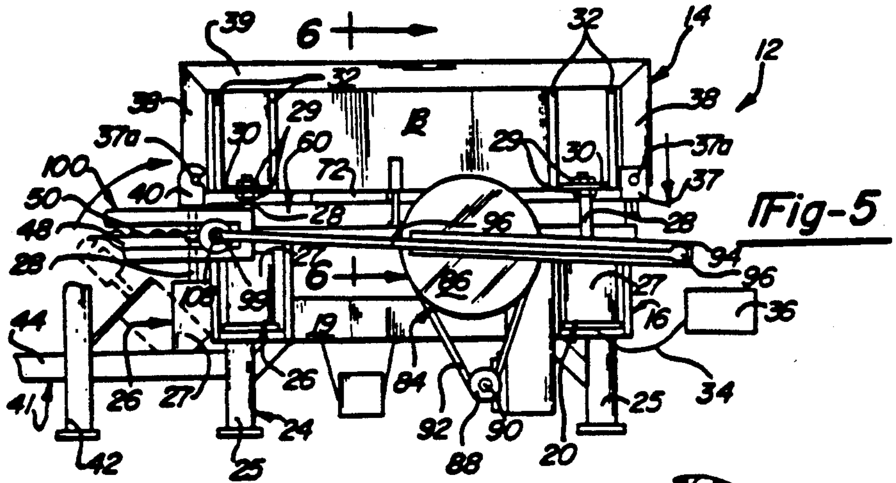
FIG. 5 is a view similar to FIG. 4 with the drawer disposed between the platens of the press.

As illustrated in FIG. 5, the fluid actuating devices 26 on the open side of the press 12 are pivoted or rotated upward such that the clamp 40 engages the rod 37*a* on the corresponding vertical flange member 38. The control panel 110 then actuates the fluid actuating devices 26 to retract the piston rods 28 to move the upper press platen 14 toward the lower press platen 16.

As illustrated in FIG. 6, the upper press platen 14 begins to move toward the lower press platen 16 to compress the nailers 68 disposed on opposite sides of the ends of the truss components 72 forming the joint to advance the projections 70 into the truss components 72. As shown in FIG. 6A, the press 12 comes in contact with the upper nailer 68 to press it into the truss components 72 and the plate member 62 of the drawer 60 moves downwardly toward the lower press platen 16 due to the yielding movement of the spring loaded pins 63 and allows the blocks 66 to press the lower nailer 68 into the truss components 72 at the joint.

Figure 7:
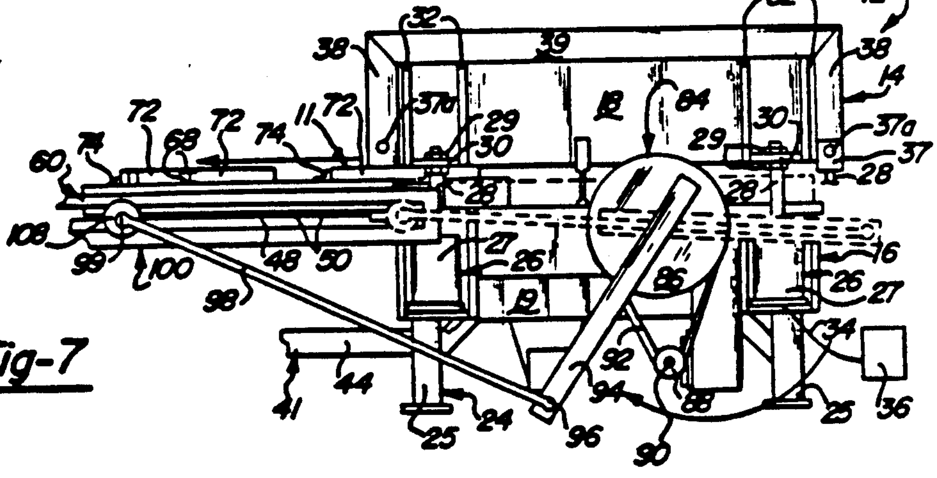
FIG. 7 is a partial elevational view of the apparatus of FIG. 1 with the drawer being moved out of the press.

When the press 12 has completed its cycle, the control panel 110 actuates the fluid actuating devices 26 to extend the rods 28 to move the upper press platen 14 away from the lower press platen 16. As illustrated in FIG. 7, the arm 94 and wheel 86 rotate to move the drawer 60 out from the space between the upper and lower press platens 14 and 16, respectively, and back toward the stand 41. When the drawer 60 is upon the table 48, the control panel 110 actuates the fluid actuating devices 52 and extends the piston rods 56 to tilt the table 48 upwardly to the inclined position. The operator then removes the truss 11 which is formed from the truss components 72 and nailers 68 as a complete single or integral unit.

The present invention has been described in an illustrative manner. It is to be understood that the terminology which has been used is intended to be in the nature words of description rather than of limitation.

Obviously, many modifications and variations of the present invention may be achieved. It is, therefore, within the scope of the appended claims the present invention may be practiced other than as specifically described.

What is claimed is:

1. A method for fabricating a truss including a plurality of truss components and a plurality of nailers having projections for engaging the truss components at the ends thereof to form a joint, the method comprising the steps of:

placing a table in an inclined position;

loading a plurality of nailers and a plurality of truss components in a predetermined configuration upon a support fixed, said support fixture slidably supported on the table;

moving the table from the inclined position to a horizontal position;

sliding the support fixture on the table horizontally and transversely to a press and placing the support fixture through an opening along one side of the press thereby disposing the support fixture between an upper press platen and a lower press platen of the press; and moving the upper press platen toward the lower press platen thereby fastening all of the plurality of nailers upon the support fixture simultaneously into the plurality of truss components thereby forming an integral one-piece truss.

2. The method as set forth in claim 1 including the steps of:

moving the upper press platen away from the lower press platen;

moving the support fixture from the press to the table;

moving the table from the horizontal position to the inclined position; and removing the truss from the support fixture.

3. A method as set forth in claim 2 wherein the step of loading comprises:

placing a first nailer inverted upon a block disposed within an aperture of the support fixture;

placing at least a pair of adjacent truss components on the support fixture partially over the aperture;

placing a second nailer upon the other side of the truss components at the aperture; and securing the second nailer to the truss components.

4. A method for fabricating a truss including a plurality of truss components and a plurality of nailers having projections for engaging the truss components at the ends thereof to form a joint, the method comprising the steps of:

placing a table in an inclined position;

loading a plurality of nailers and a plurality of truss components in a predetermined configuration upon a support fixture, said support fixture slidably supported on the table;

moving the table from the inclined position to a horizontal position;

sliding the support fixture on the table horizontally and transversely to a press and placing the support fixture through an opening along one side of the press thereby disposing the support fixture between an upper press platen and a lower press platen of the press;

rotating one or more fluid actuating devices along the open side of the press upward to engage the upper press platen; actuating one or more fluid actuating devices and moving the upper press platen toward the lower press platen thereby fastening all of the plurality of nailers upon the support fixture simultaneously into the plurality of truss components thereby forming an integral one-piece truss;

actuating one or more fluid actuating devices and moving the upper press platen away from the lower press platen;

rotating one or more fluid actuating devices along a side of the press downward thereby disengaging the upper press platen and thereby forming an opening along one side of the press;

sliding the support fixture from the press through the opening horizontally to the table;

moving the table from the horizontal position to the inclined position;

removing the integral one-piece truss from the support fixture;

said step of loading comprising placing a first nailer inverted upon a block disposed within an aperture of the support fixture, placing at least a pair of adjacent truss components on the support fixture partially over the aperture, placing a second nailer upon the other side of the truss components at the aperture, and securing the second nailer to the truss components.

* * * * *

UNITED STATES PATENT AND TRADEMARK OFFICE
CERTIFICATE OF CORRECTION

PATENT NO. : 4,998,336
DATED : March 12, 1991
INVENTOR(S) : John Papsdorf

It is certified that error appears in the above-identified patent and that said Letters Patent is hereby corrected as shown below:

Abstract line 10, delete "slidably".
Column 1, line 17, "nail" should be --nails--.
Column 4, line 14, "inclinded" should be --inclined--.
Column 4, line 28, "61aof" should be --61a of--.
Column 5, line 45, "vertical" should be --vertically--.
Column 5, line 66, "inclinded" should be --inclined--.
Column 6, line 23, after "wheel" (second occurrence) insert --86--.
Column 7, line 15, Claim 1, "fixed" should be --fixture--.
Column 7, line 3, Claim 2, "The" should be --A--.
Column 8, line 21, Claim 4, begin new paragraph with "actuating".

Signed and Sealed this
Fifteenth Day of September, 1992

*Attest:*

DOUGLAS B. COMER

*Attesting Officer* — *Acting Commissioner of Patents and Trademarks*